United States Patent Office 3,272,702
Patented Sept. 13, 1966

3,272,702
GROWTH PROMOTANT PROCESS
Maurice A. Schooley, White Plains, N.Y., and Byron M. Shinn, Western Springs, Ill., assignors to Armour and Company, Chicago, Ill., a corporation of Delaware
No Drawing. Filed Feb. 6, 1963, Ser. No. 256,542
The portion of the term of the patent subsequent to April 16, 1980, has been disclaimed
11 Claims. (Cl. 167—53)

This invention relates to a novel growth promoting process.

This application is a continuation-in-part of U.S. patent application Serial No. 765,054, now U.S. Patent No. 3,085,933.

It has been found that a number of so-called growth promoting substances, when introduced into an animal orally, by subcutaneous implantation, or otherwise, result in accelerated growth of the animal. As reported in the literature, there are certain non-nutritional substances, such as insoluble derivatives of surfactants, which under certain conditions stimulate growth. It has been postulated that the growth promoting properties of these substances may be related to their bactericidal and bacteriostatic characteristics, and that, therefore, their principal effect is to suppress diseases of animals, including subclinical diseases which are not manifest. Animals thus treated, therefore, are more healthy and tend to grow and gain weight at an increased rate.

Another class of substances which fall within the category of growth promotants are estrogenic compounds. It is believed that the growth promoting characteristics of these substances are due to the effect that they have on the metabolism of the animals themselves. The growth and weight accelerating advantages of these substances have made their use desirable and profitable even though it has been recognized that their use presents certain inherent difficulties. One of the problems encountered in the livestock industry, for example, in employing estrogenic substances alone as a growth promotant has been the fact that in many instances their use will result in a downgrading or a lowering of the government grade of the animal in which they are introduced. The downgrading may occur to such an extent that even though more pounds of edible flesh are produced for each dollar invested in the raising of the animal, the total economic return from the sale of the animal for food purposes actually will be less than that received from animals which have not been treated with the estrogenic substance. Generally, this effect has dictated that the estrogens be introduced into animals at sufficiently low levels to reduce the problem of downgrading. However, at the lower levels the growth promoting results achieved may be substantially reduced.

It can be seen from this that it would be desirable to diminish the disadvantages encountered in the use of estrogenic substances without adversely affecting their growth promoting properties. Viewed in a different light, it would also be worthwhile if these disadvantages could be reduced and the growth promoting properties of the estrogenic substances maintained or even enhanced.

We have now discovered that these objects can be accomplished by treating animals with both an estrogenic substance and a substantially water-insoluble salt of a cationic surfactant. The surprising result of this method is an increased feed efficiency and promotion of growth in animals, while at the same time the grade of the animal is substantially maintained.

In accordance with the present invention, certain surfactants which have been chemically modified so as to display substantially no surface activity in water and a minor amount of an estrogenic substance, when introduced into ruminants, demonstrate superior growth promoting properties while at the same time eliminating the disadvantages resulting from the use of the estrogenic substance alone. The mechanism of the action has not been elucidated, but the net effect is demonstrable and pronounced.

While a variety of active estrogenic substances may be employed to achieve the advantages of this invention, the stilbene derivatives are particularly suited. These preferred derivatives include such compounds as diethylstilbestrol, dienestrol, hexestrol; their lower alkyl ethers such as dianisylhexene, dianisylhexadiene and dianisylhexane; and esters such as dienestrol diacetate. Also contemplated by this invention are estrogen derivatives such as those comprising 4,4'-oxygenated stilbene derivatives or 4,4'-oxygenated diphenylhexane derivatives, said derivatives having at least two substituents in the aromatic nuclei, the substituents being made up of aliphatic straight chains containing at least two carbon atoms, branch chains, aromatic rings, and cyclic and heterocyclic rings. Specific examples of this last mentioned class of estrogen derivatives are 3,3'-diallyldiethylstilbestrol, 3,3'-diallylhexestrol, 3,3'-dipropylhexestrol, and 3,3'-dipropyldiethylstilbestrol. Of the derivatives defined, diethylstilbestrol is most commonly used. This compound, commonly referred to as stilbestrol, is a well-known synthetic organic chemical possessing estrogenic activity.

The general class of modified surfactants having utility for the purpose of this invention can be designated as the substantially water-insoluble reaction product of the cationic fragment of a cationic surfactant with the anionic fragment of either an anionic surfactant or an anionic polyelectrolyte. The cationic fragment of these growth promotant materials may be derived from surface active quaternary ammonium salts, such as the alkyltrimethylammonium halides, dialkyldimethylammonium halides, trialkylmethylammonium halides, wherein the alkyl group or groups can contain from 8 to 22 carbon atoms and can be saturated or unsaturated. Instead of an alkyl group of the character described, the surface active quaternary ammonium compound can contain an aromatic group, such as the benzyl group, and thus the cationic fragment of this reaction product can be obtained from such compounds as alkylbenzyldimethylammonium halides. We mention, for example, such specific cationic surfactants from which this cationic fragment can be derived as dimethyldidodecylammonium chloride, trimethyldodecylammonium chloride, dimethyldioctadecylammonium chloride, trimethyloctadecylammonium chloride, dodecyldimethylbenzylammonium chloride, octadecyldimethylbenzylammonium chloride, (p-diisobutylphenoxyethoxy) ethylbenzenedimethylammonium chloride, trimethyloctylammonium chloride, dimethyldodecylbenzylammonium chloride and methyltrioctadecylammonium chloride. Also, mixtures of different cationic surfactants can be employed, such as the natural occurring mixtures where the quaternary ammonium compound is prepared from a natural fatty acid source. For example trimethyl "coco" ammonium chloride, dimethyldi "tallow" ammonium chloride, trimethyl "soya" ammonium chloride, etc., are suitable sources for the cationic fragments of this reaction product. This cationic fragment may also be derived from surface active primary, secondary and tertiary amines, such as alkylamines, dialkylamines, dimethylalkylamines, bis(2-hydroxyethyl) alkylamines and N-alkyl-1,3-propanediamines, wherein the amines contain at least one alkyl chain having 8 to 22 carbon atoms. By way of specific example, we mention such suitable amines as octadecylamine, dimethyloctadecylamine, bis(2-hydroxyethyl)octadecylamine, methyldioctadecylamine, dioctadecylamine, dimethyldodecylamine, and N-dodecyl-1,2-propanediamine. Further, polyamines, such as N-dodecyltrimethylenediamine and cyclic nitrogen compounds such as 1-alkylpyridinium halides, for example octadecylpyridinium chloride, can be employed to derive the cationic fragment of this reaction product.

The anionic fragment of the substantially water-insoluble polyelectrolyte derivatives of the cationic surfactants having utility for the purpose of this invention may be derived from any anionic polyelectrolyte, such as polysulfonic acids, e.g., a hexasulfonic acid (Suramin) and polysulfonic acid resins (Amberlite IR–105); non-polymeric polysulfonic acids, e.g., acidicazo-dye such as Trypan Red and Direct Blue BB; polysulfuric esters, e.g. agar agar and charrageen mucilage; polycarboxylic acids; e.g. polyacrylic acid, weak cation exchange resins, arabic acid, alginic acid, pectic acid; polysaccharinic acids such as carboxymethylcellulose, oxidized starch, mucin, hyaluronic acid, polyglucuronic acid, and acids derived from naturally occurring gums such as tragacanth, locust bean, quince seed, linseed, karaya and acacia; mixed polycarboxylic acids and polysulfuric acid esters, e.g. heparin and chondroitin sulfuric acids; polyphosphonic acids, e.g. Duolite C–61; polyphosphoric acid esters, e.g. Duolite C–65 and phytic acid (hexaphosphoric acid ester); and polysilicates, e.g. bentonite.

The anionic fragment of the substantially water-insoluble anionic surfactant derivatives of the cationic surfactants contemplated by this invention may be derived from such compounds as fatty acids and soap, i.e. sodium or potassium salts of a higher fatty acid, e.g. sodium stearate, potassium oleate, potassium octanoate, sodium decanoate, sodium laurate or other salts of fatty acids containing from 8 to 22 carbon atoms in which the hydrocarbon chains are either saturated or unsaturated. Also, this anionic fragment can be derived from such synthetic anionic surfactants as alkyl sulfates, alkyl sulfonates, alkyl aryl sulfonates and dialkyl sulfosuccinates. Further, such surface active compounds as cyclic acids, e.g. abietic and cholic, and acyl methyl taurides may be employed in producing this anionic fragment of the reaction product. By way of specific example of the type of synthetic anionic surfactants useful in forming the compounds of this invention, we mention dodecylsulfate, octadecylbenzenesodium sulfate, the ester of oleic acid, and hydroxy ethane sodium sulfonate.

In a preferred embodiment of the present invention, the improved process for promoting the growth of animals comprises implanting an estrogenic substance, such as described above, in ruminants and feeding the ruminants the insoluble salt of a cationic surfactant, such as described above. By employing this method, it is found that there is an increased feed efficiency and promotion of growth in animals, while at the same time the grade of the animal is surprisingly maintained at the same grade as originally graded, whereas when an estrogenic substance alone is used, there is a definite lowering of the government grade.

This invention can be further illustrated by the following examples:

EXAMPLE I

A feeding trial, lasting 112 days, was conducted on steers and heifers to test the growth promotant properties of various concentrations of diethylstilbestrol (DES) and a mixture of trialkylhexadecyl and trialkyloctadecyl-ammonium stearate (TAS). The test animals were divided as evenly as possible into six lots, so that each lot contained aproximately the same number of animals having about the same government grade. DES was introduced either by subcutaneous implants or orally and TAS was introduced orally. The results of these tests art summarized in Tables I and II below:

*Table 1*

| Lot | 1 | 2 | 3 | 4 | 5 | 6 |
|---|---|---|---|---|---|---|
| Treatment | | DES | DES | TAS | TAS+DES | TAS+DES |
| | Control | (36 mg. implant) | (10 mg. daily) | Control | (36 mg. implant) | (10 mg. daily) |
| No. steers | 13 | 12 | 13 | 13 | 12 | 12 |
| Av. Wt. (lb.): | | | | | | |
| Initial | 593 | 599 | 595 | 606 | 605 | 575 |
| Final | 855 | 889 | 889 | 880 | 925 | 866 |
| Gain | 262 | 290 | 294 | 274 | 320 | 291 |
| Daily Gain | 2.33 | 2.59 | 2.63 | 2.45 | 2.85 | 2.60 |

*Table II*

| Lot | 1 | 2 | 3 | 4 | 5 | 6 |
|---|---|---|---|---|---|---|
| Treatment | | DES | DES | TAS | TAS+DES | TAS+DES |
| | Control | (18 mg. implant) | (24 mg. implant) | Control | (18 mg. implant) | (24 mg. implant) |
| No. heifers | 13 | 13 | 13 | 12 | 12 | 12 |
| Av. Wt. (lbs.): | | | | | | |
| Initial | 594 | 595 | 587 | 581 | 572 | 587 |
| Final | 740 | 754 | 763 | 746 | 773 | 782 |
| Gain | 146 | 159 | 176 | 165 | 201 | 195 |
| Daily Gain | 1.75 | 1.89 | 2.10 | 1.96 | 2.40 | 2.33 |

TAS fed at rate of 1.5 grams/head/day (steers and heifers).

Ration hand fed as follows—⅔ rolled barley; ⅓ dried molasses beet pulp; grass hay roughage; 1# 32% protein supplement pellets as follows:

| | Pounds/ton |
|---|---|
| Wheat mixed feed | 650 |
| Soybean meal | 650 |
| Cottonseed meal | 350 |
| Urea | 30 |
| Dehydrated alfalfa | 100 |
| Di-calcium phosphate | 50 |
| Bone meal | 6 |
| Salt | 20 |
| Trace minerals | 5 |
| Molasses | 140 |

The steers in lot 5 receiving TAS and DES implants gained 22% more than controls, and 10% more than those implanted with DES alone. The heifers showed a similar pattern for this class of animals.

EXAMPLE II

A slightly different ration from that of Example I, and a different level of TAS under feed lot conditions were employed. The animals to be tested were divided as evenly as possible into 4 groups, so each group contained about the same number of animals having about the same government grade. The complementary effect of the combination of TAS and DES produced the results tabulated below:

| | Group 1 | Group 2 | Group 3 | Group 4 |
|---|---|---|---|---|
| | Control | 36 mg. DES implant | 2 g. TAS | TAS plus 36 mg. DES implant |
| No. steers | 20 | 20 | 20 | 20 |
| Av. Int. Wt | 619 | 616 | 606 | 610 |
| Av. Final Wt | 918 | 973 | 958 | 976 |
| Days on Test | 101 | 101 | 101 | 101 |
| Av. Daily Gain | 2.97 | 3.54 | 3.48 | 3.63 |

| Ration: | Percent |
|---|---|
| Barley | 45 |
| Cull peas | 17 |
| Cut pulp | 7.5 |
| Cane molasses | 5 |
| Salt | 0.5 |
| Alfalfa | 25 |

TAS alone (group 3) gave a 0.51 pound per head per day increase over the controls. DES alone (group 2) gave a 0.57 pound increase whereas the combination (group 4) increased gains 0.66 pounds per head per day.

EXAMPLE III

Under field conditions in the summer months, the advantages of the combination of TAS and DES were shown as follows:

| | Lot 1 | Lot 2 |
|---|---|---|
| | 10 mg. DES daily | 10 mg. DES daily 1 gram TAS daily |
| No. steers | 19 | 19 |
| Av. starting wt | 731 | 742 |
| Av. final wt | 1,080 | 1,136 |
| Gain/steer | 349 | 394 |
| Av. daily gain (May 12–Aug. 31) | 3.14 | 3.55 |

Ration: 1 #—32% protein supplement/head/day.
Roughage: corn silage; alfalfa hay; 2 lbs. dried beet pulp; plus—

| Grain mixture: | Percent |
|---|---|
| Corn | 25 |
| Wheat | 50 |
| Barley | 25 |

EXAMPLE IV

The same pattern as in the preceding examples was shown with a larger number of animals as follows:

| | Control | TAS | 10 mg. DES daily | 2 g. TAS plus 10 mg. DES daily |
|---|---|---|---|---|
| No. head | 112 | 115 | 118 | 113 |
| Av. Int. Wt | 767 | 772 | 767 | 770 |
| Av. Final Wt | 1,022 | 1,079 | 1,082 | 1,099 |
| Av. Daily Gain | 2.15 | 2.60 | 2.70 | 2.84 |
| Yield, percent | 61.79 | 62.17 | 61.91 | 61.58 |

EXAMPLE V

A ration high in concentrates and self feeding was employed. The animals were implanted with 36 mg. DES at the beginning of the experiment. Twenty-six cattle were divided as evenly as possible with 14 in one lot and 12 in the other. The 14 animal lot was fed only the ration, whereas the 12 animal lot was fed the ration supplemented with 200 grams of TAS per ton of total ration. The following results were obtained in a 160 day study:

| | 36 mg. DES implant | 36 mg. DES implant plus 200 g. TAS/ton feed |
|---|---|---|
| No. animals | 14 | 12 |
| Initial Wt | 704 | 708 |
| Final Wt | 1,114 | 1,157 |
| Av. daily gain | 2.79 | 3.10 |
| Av. daily feed cons | 24.4 | 28.2 |
| Feed/100 lbs. gain | 875 | 908 |
| Percent Shrink | 3.57 | 4.36 |
| Dressing, percent | 60.90 | 62.71 |
| Av. Carcass Wt | 657.7 | 710.8 |
| Av. Selling price cwt | 28.15 | 29.51 |
| Av. Selling price/head | 304.07 | 334.51 |
| Av. carass grade: | | |
| Choice+ | 1 | 4 |
| Choice | 4 | 5 |
| Choice− | 4 | 1 |
| Good+ | 2 | 0 |
| Good | 1 | 0 |

| Ration: | Percent |
|---|---|
| Rolled shelled corn | 67.5 |
| Soybean oil meal | 10.0 |
| Ground alfalfa hay | 20.0 |
| Bone meal | 1.0 |
| Trace Mineral Salt | 1.5 |

From the above, it is seen that the lot which was implanted with DES and then fed TAS had higher graded animals than the lot which was implanted with DES alone, although each lot originally had animals of approximately the same grade.

EXAMPLE VI

Finally the effects of TAS alone, DES alone and the combination of the two drugs were tested in steer calves on a constant intake of a wintering ration, as follows:

| Lot No | 1 | 2 | 3 | 4 |
|---|---|---|---|---|
| Treatment: | | | | |
| TAS 0.59 orally | 0 | X | 0 | X |
| Des 10 mg. orally | 0 | 0 | X | X |
| No. Steers | 73 | 69 | 67 | 71 |
| Av. Init. Wt | 401 | 395 | 388 | 388 |
| Final Wt | 556 | 575 | 568 | 595 |
| Gain | 155 | 180 | 180 | 207 |
| Daily gain | 1.31 | 1.53 | 1.53 | 1.75 |
| Feed/Cwt. gain | 1,206 | 1,039 | 1,039 | 903 |

The growth promotant process described herein not only speeds up the growth of the animal but also maintains the "grade" of the animal and improves the efficiency of feed conversion. This is an important advantage since it makes the growing process economical for animal raisers by requiring less feed per pound of weight gain while producing a high grade animal.

While in the foregoing specification various embodiments of this invention have been set forth and specific details thereof elaborated for the purpose of illustration, it will be apparent to those skilled in the art that the invention is susceptible to other embodiments and that many of these details may be varied widely without departing from the basic concept and spirit of the invention.

We claim:

1. A process for promoting growth in animals, comprising the steps of introducing into said animals a synthetic estrogenic substance and a substantially water-insoluble salt of a cationic surfactant.

2. A process for promoting the growth of the animals, comprising the step of introducing into said animals a synthetic estrogenic substance and a substantially water-insoluble compound composed of a cationic fragment of a cationic surfactant and the anionic fragment of an anionic surfactant.

3. A process for promoting the growth of the animals, comprising the step of introducing into said animals a synthetic estrogenic substance and a substantially water-insoluble compound composed of a cationic fragment of a cationic surfactant and the anionic fragment of an anionic polyelectrolyte.

4. The process of claim 2 in which the estrogenic substance is a stilbene derivative and the cationic surfactant is a quaternary ammonium surfactant.

5. The process of claim 3 in which the estrogenic substance is a stilbene derivative and the cationic surfactant is a quaternary ammonium surfactant.

6. The process of claim 4 in which the quaternary ammonium surfactant is a trimethylalkyl ammonium compound in which the alkyl group contains from 8 to 22 carbon atoms.

7. A process for promoting the growth of animals comprising the steps of implanting said animals with an estrogenic stilbene derivative and then feeding said animals a substantially water-insoluble salt of a trimethyloctadecyl ammonium surfactant.

8. A process for promoting the growth of animals, comprising the steps of implanting said animals with diethylstilbestrol and then feeding said animals trimethyloctadecyl ammonium stearate.

9. A process for promoting the growth of animals, comprising the steps of implanting said animals with a synthetic estrogenic substance and then feeding said animals a substantially water-insoluble salt of a cationic surfactant.

10. A process for promoting the growth of animals, comprising the steps of implanting said animals with a synthetic estrogenic substance and then feeding said animals mixtures of substantially water-insoluble salts of cationic surfactants.

11. A process for promoting the growth of animals, comprising the steps of implanting said animals with diethylstilbestrol and then feeding said animals with a mixture of trimethyl hexadecyl ammonium stearate and trimethyloctadecyl ammonium stearate.

References Cited by the Examiner

UNITED STATES PATENTS 3,085,933    4/1963    Schooley _____ 167—53

OTHER REFERENCES

Gassner: Recent Progress in Hormone Research, vol. XIV, 1958, Academic Press, New York, New York, pages 194–197.

JULIAN S. LEVITT, *Primary Examiner.*

FRANK CACCIAPAGLIA, JR., *Examiner.*

SAM ROSEN, *Assistant Examiner.*